United States Patent
Rotem-Gal-Oz et al.

(10) Patent No.: US 9,772,841 B1
(45) Date of Patent: *Sep. 26, 2017

(54) SYSTEM, METHOD, AND COMPUTER PROGRAM FOR BIG DATA INTEGRATION AND CONFIGURATION

(71) Applicant: Amdocs Development Limited, Limassol (CY)

(72) Inventors: Arnon Rotem-Gal-Oz, Haifa (IL); Nir Pedhazur, Petah Tikva (IL)

(73) Assignee: Amdocs Development Limited, Limassol (CY)

( * ) Notice: Subject to any disclaimer, the term of this patent is extended or adjusted under 35 U.S.C. 154(b) by 0 days.

This patent is subject to a terminal disclaimer.

(21) Appl. No.: 15/080,436

(22) Filed: Mar. 24, 2016

Related U.S. Application Data

(63) Continuation of application No. 14/465,703, filed on Aug. 21, 2014, now Pat. No. 9,304,763.

(51) Int. Cl.
  *G06F 9/44* (2006.01)
  *G06F 9/445* (2006.01)
(52) U.S. Cl.
  CPC . *G06F 8/70* (2013.01); *G06F 8/60* (2013.01)
(58) Field of Classification Search
  CPC ........................................................ G06F 8/70
  USPC .......................................................... 717/120
  See application file for complete search history.

(56) References Cited

U.S. PATENT DOCUMENTS

| | | | | |
|---|---|---|---|---|
| 5,835,777 A | * | 11/1998 | Staelin ...................... | G06F 8/61 717/175 |
| 2002/0099845 A1 | * | 7/2002 | Passanisi .................. | G06F 8/60 709/236 |
| 2010/0175044 A1 | * | 7/2010 | Doddavula ............... | G06F 8/38 717/104 |
| 2014/0096129 A1 | * | 4/2014 | Kimmet .................... | G06F 8/61 717/177 |
| 2014/0325476 A1 | * | 10/2014 | Sayers ...................... | G06F 8/70 717/115 |

\* cited by examiner

*Primary Examiner* — James D Rutten
(74) *Attorney, Agent, or Firm* — Zilka-Kotab, PC

(57) ABSTRACT

A system, method, and computer program product are provided for big data integration and configuration. In use, a plurality of components associated with a big data solution are defined in a domain specific language utilizing one or more code generation tools. Additionally, relevant artifacts for the plurality of components associated with the big data solution are generated. Further, the relevant artifacts are packaged into a manifest, the manifest including elements required to support at least one business process. In addition, environment dependent variables of the manifest are replaced with target values associated with a target big data environment to which the manifest is to be deployed. Moreover, the manifest is deployed into operation in the target big data environment.

11 Claims, 4 Drawing Sheets

SYSTEM, METHOD, AND COMPUTER PROGRAM FOR BIG DATA INTEGRATION AND CONFIGURATION

CLAIM OF PRIORITY

This application is a continuation of U.S. application Ser. No. 14/465,703, filed Aug. 21, 2014, the entire contents of which are incorporated herein by reference.

FIELD OF THE INVENTION

The present invention relates to big data platforms and more particularly to the integration and configuration of big data across disperse technologies.

BACKGROUND

Solutions built in a big data system typically include a variety of technologies and components. For instance, a typical Hadoop solution include various jobs written in Pig, Hive, and/or a general programming language such as Java, etc. Additionally, a typical solution may have some scheduling configuration for Apache Oozie and configurations for Hive and/or HBase, etc.

Currently, there is no efficient end-to-end process for defining and deploying solutions of a big data solution. There is thus a need for addressing these and/or other issues associated with the prior art.

SUMMARY

A system, method, and computer program product are provided for big data integration and configuration. In use, a plurality of components associated with a big data solution are defined in a domain specific language utilizing one or more code generation tools. Additionally, relevant artifacts for the plurality of components associated with the big data solution are generated. Further, the relevant artifacts are packaged into a manifest, the manifest including elements required to support at least one business process. In addition, environment dependent variables of the manifest are replaced with target values associated with a target big data environment to which the manifest is to be deployed. Moreover, the manifest is deployed into operation in the target big data environment.

DETAILED DESCRIPTION

Figure 1:
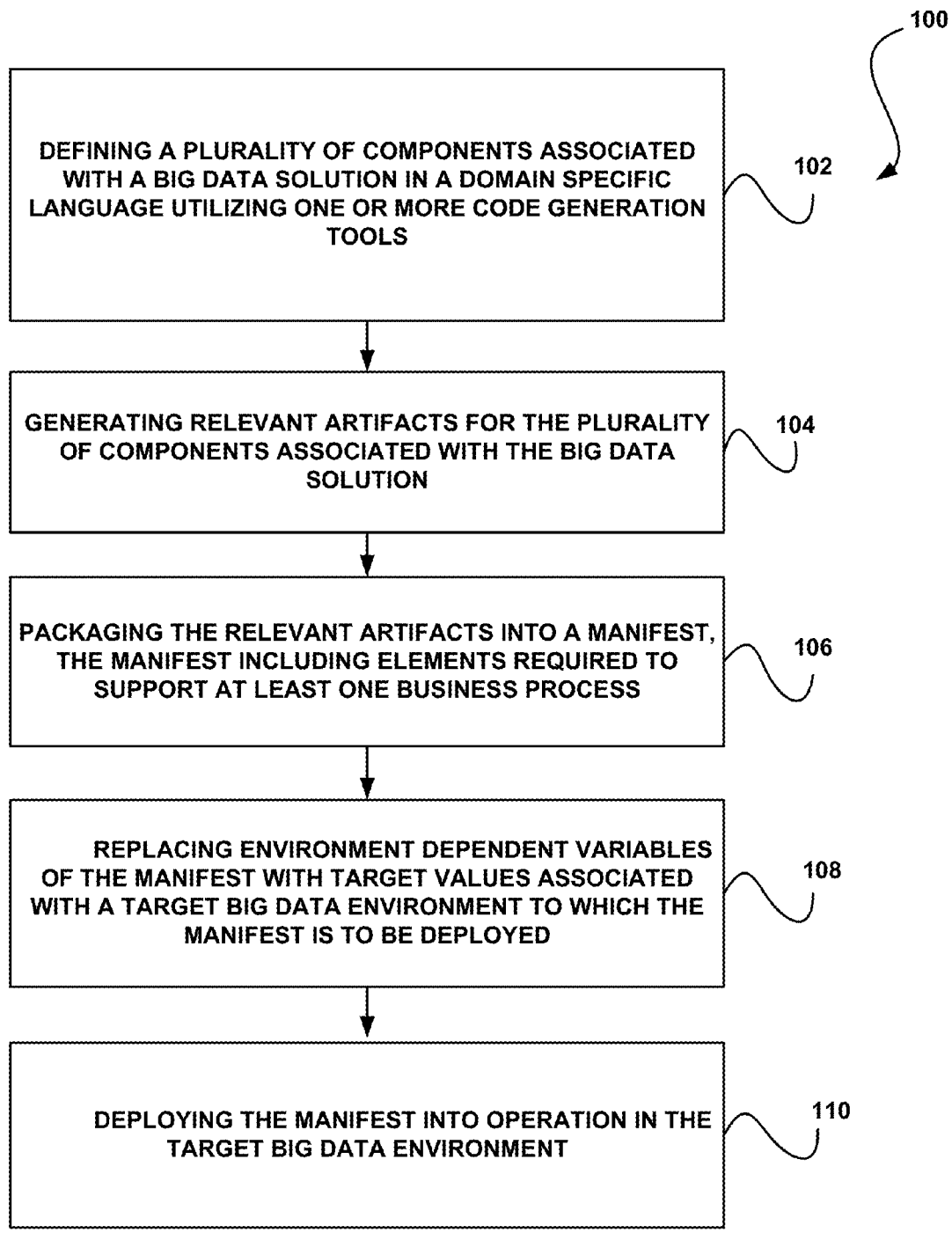
FIG. 1 illustrates a method for big data integration and configuration, in accordance with one embodiment.

FIG. 1 illustrates a method 100 for big data integration and configuration, in accordance with one embodiment.

As shown, a plurality of components associated with a big data solution are defined in a domain specific language utilizing one or more code generation tools. See operation 102.

The domain specific language may include any domain specific language that is built around the various big data components. In one embodiment, the domain specific language may be built around various big data components for integration along with an eclipse-based integrated development environment to support development of the domain specific language.

Additionally, the components associated with the big data solution may include any data structure. For example, the components may include entities associated with the big data solution. As another example, the components may include events associated with the big data solution. As another example, the components may include lookup operations associated with the big data solution.

Further, defining the components associated with the big data solution may include defining a plurality of components across disperse technologies. Moreover, the components may be defined utilizing a variety of code generation tools. In this case, the code generation tools may be operable to configure and tie relevant technologies of the big data solution to create new data products in big data environments.

As shown further in FIG. 1, relevant artifacts for the plurality of components associated with the big data solution are generated. See operation 104. The artifacts may include any artifacts associated with the components, such as files, scripts, and configurations, etc.

For example, the code generation tools may use code generation to create artifacts for downstream systems and components such as defining schemas in a meta-store, scheduling jobs, generating scripts, etc.

Further, the relevant artifacts are packaged into a manifest. See operation 106. The manifest includes elements required to support at least one business process.

The manifest may represent any packaging list of applications and the processes that makes them (e.g. defining a deployable unit). The manifest may include a list of artifacts (e.g. files, scripts, configurations, etc.).

In addition, environment dependent variables of the manifest are replaced with target values associated with a target big data environment to which the manifest is to be deployed. See operation 108. Replacing the environment dependent variables of the manifest with the target values associated with the target big data environment may function to provide an environment dependent value that is populated independent of a business process.

In one embodiment, the method 100 may further include replacing environment dependent configurations of the manifest with target configurations associated with the target big data environment to which the manifest is to be deployed. In this case, replacing environment dependent configurations of the manifest with target configurations may function such that an environment dependent configuration is separated from a business configuration.

Moreover, the manifest is deployed into operation in the target big data environment. See operation 110.

Accordingly, the method 100 may be employed to simplify the end-to-end process for defining and deploying solutions of a big data solution. This includes utilizing a set code generations tools to define common elements, across disperse technologies using a high-level declarative language and to define environment dependent configurations separated from the business configuration. The techniques describe the tools needed to integrate and deploy a complete solution to a big data cluster.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
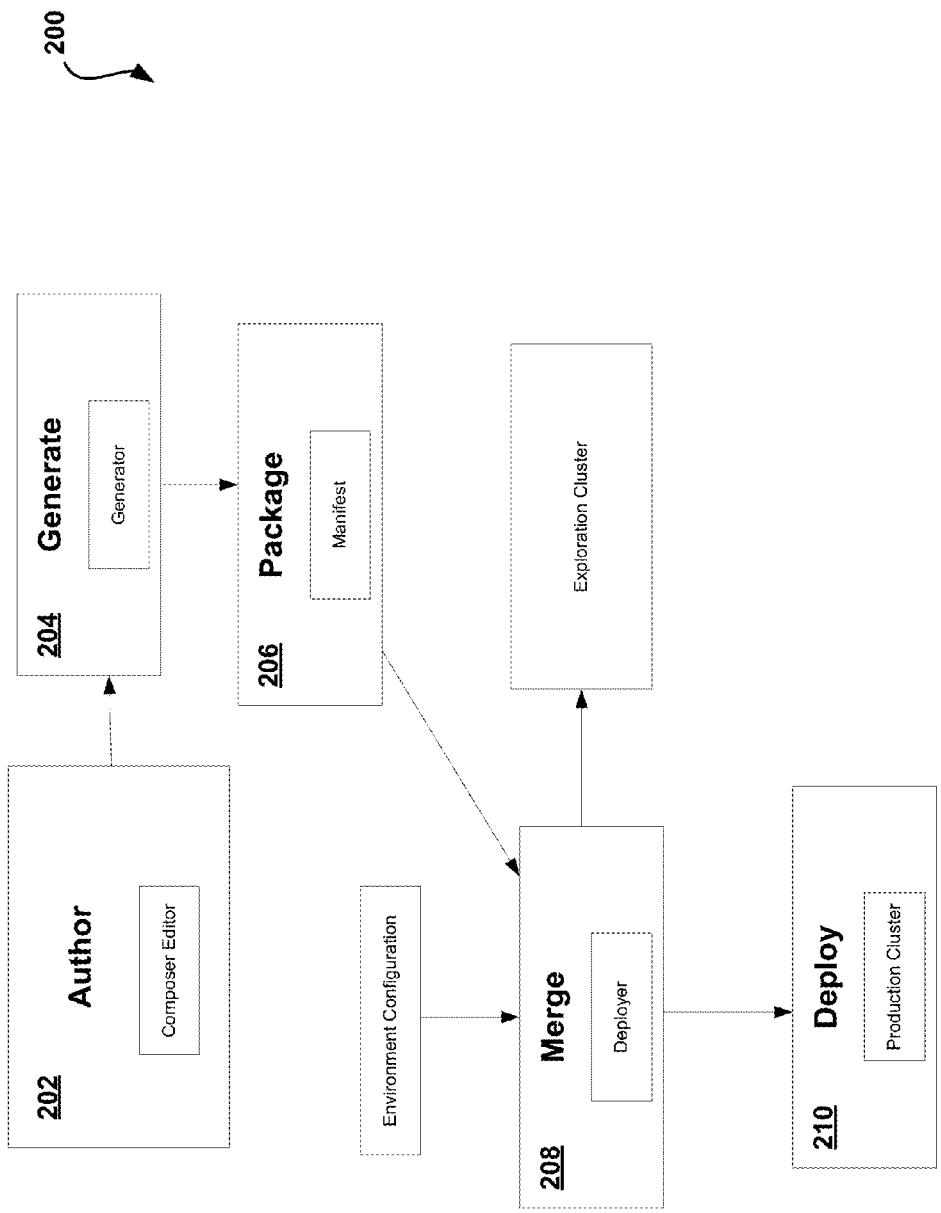
FIG. 2 illustrates a system for big data integration and configuration, in accordance with one embodiment.

FIG. 2 illustrates a system flow 200 for big data integration and configuration, in accordance with one embodiment. As an option, the system flow 200 may be implemented in the context of the details of FIG. 1. Of course, however, the system flow 200 may be implemented in the context of any desired environment. Further, the aforementioned definitions may equally apply to the description below.

The system may utilize a domain specific language (DSL) that is built around the various big data components for integration along with an eclipse-based integrated development environment (IDE) to support the development of the domain specific language. The system also employs a series of code-generation tools to configure and tie the relevant technologies, thus greatly accelerating the time for creating new data products in big data environments.

Table 1 shows a sample script to be used as an example.

TABLE 1

```
event FlowEventTest {
    Retention {
        period 14 days
        partitionResolution 15min
    }
    Long eventId { validate @0..9 }
    Long number { validate @0..9 }
    String IMSI { validate @a..z|0..9 }
    String MSISDN { validate @0..9 }
    String description { validate @a..z|0..9 }
    Long EnvironmentId {$Asc.EnvironmnetId}
}
```

The script of Table 1 is operable to generate: 1) A Hive table with the defined schema and partition strategy; 2) A structure definition that can be used in other scripts and perform the validations; 3) A configuration for a clean-up job that will remove expired items (items older than 14 days in this case); and 4) A schedule for cleaning up expired items.

When deploying these artifacts, some of the values (e.g. EnvironmentId in this example) would be replaced with an environment dependent value that is populated independent of the business process in a configuration tool.

With reference to FIG. 2, the system flow may be implemented by one or more composer tools, which may include a computer application including a variety of code and may employ one or more user interfaces, etc.

The composer may include a design-time tool which aims to prevent the system from having major configuration issues. The composer may be a centralized system that is integrated with a development environment for defining the domain entities as well as transformations.

The composer may include an editor for a domain specific language. The domain specific language enables defining system data structures (e.g. entities, events, lookups, etc.) and the configuration of jobs. Based on the domain specific language specifications, the composer may use code generation to create artifacts for downstream systems and components such as defining schemas in Hive's meta-store, scheduling jobs in Oozie, generating Pig scripts, etc. Lastly, the composer's deployment tool may combine generated artifacts with an environment dependent setting and deploy the artifact into clusters.

As an example, the process of the composer may include implementing steps as illustrated by the system flow 200. In operation, the composer may author one or more scripts to define one or more components. See operation 202.

The composer includes a domain specific language for integration of components and systems. The composer may include an integrated development environment to support the development using the domain specific language.

Once the implementation is completed the next step is to generate the relevant artifacts for the different components of the solutions. See operation 204.

These artifacts are then assembled together into a manifest, which includes all the different bits that support a business process, as a packaging step. See operation 206.

Environment dependent variables and configurations are replaced with their target value (depending on the environment the manifest should be deployed into), as part of a merging step. See operation 208.

The manifest is then deployed into operation on the target cluster. See operation 210.

In one embodiment, both the composer language and the generation plugins may be open for extension so new components and integrations can be added as needed.

Thus, a system may implement the techniques described herein to employ an integrated code driven open environment that handles integration, definition and deployment into big data systems. The composer environment and the domain specific language allows both for hiding some of the complexity (e.g. especially around the integration of dispersed technologies), as well as focusing on intent as opposed to implementation details. The set of code generations and the IDE extension alleviate a lot of the integration rote as components (entities, facts, etc.) are defined once such that all the involved artifacts may be synchronized.

Figure 3:
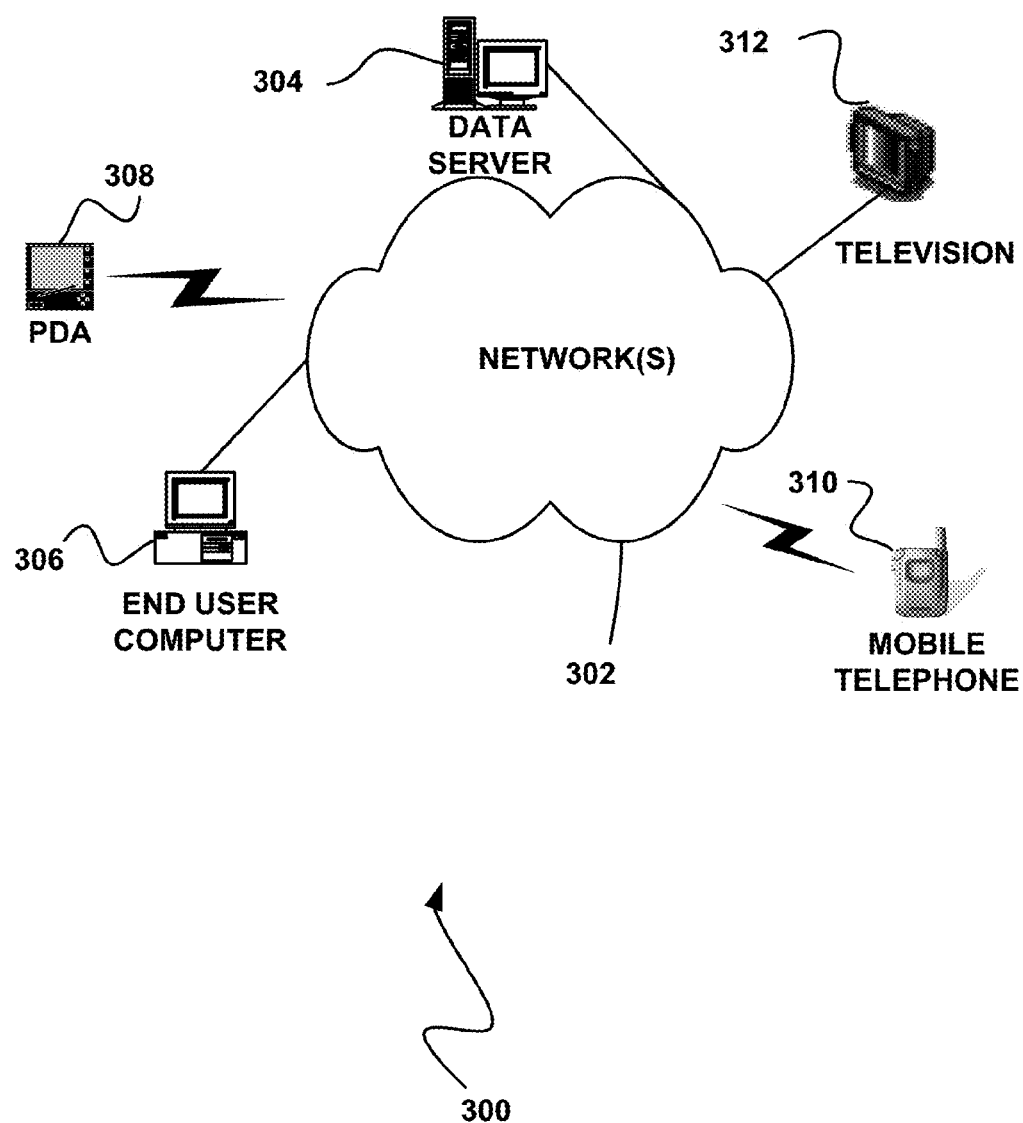
FIG. 3 illustrates a network architecture, in accordance with one possible embodiment.

FIG. 3 illustrates a network architecture 300, in accordance with one possible embodiment. As shown, at least one network 302 is provided. In the context of the present network architecture 300, the network 302 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 302 may be provided.

Coupled to the network 302 is a plurality of devices. For example, a server computer 304 and an end user computer 306 may be coupled to the network 302 for communication purposes. Such end user computer 306 may include a desktop computer, lap-top computer, and/or any other type of logic. Still yet, various other devices may be coupled to the network 302 including a personal digital assistant (PDA) device 308, a mobile phone device 310, a television 312, etc.

Figure 4:
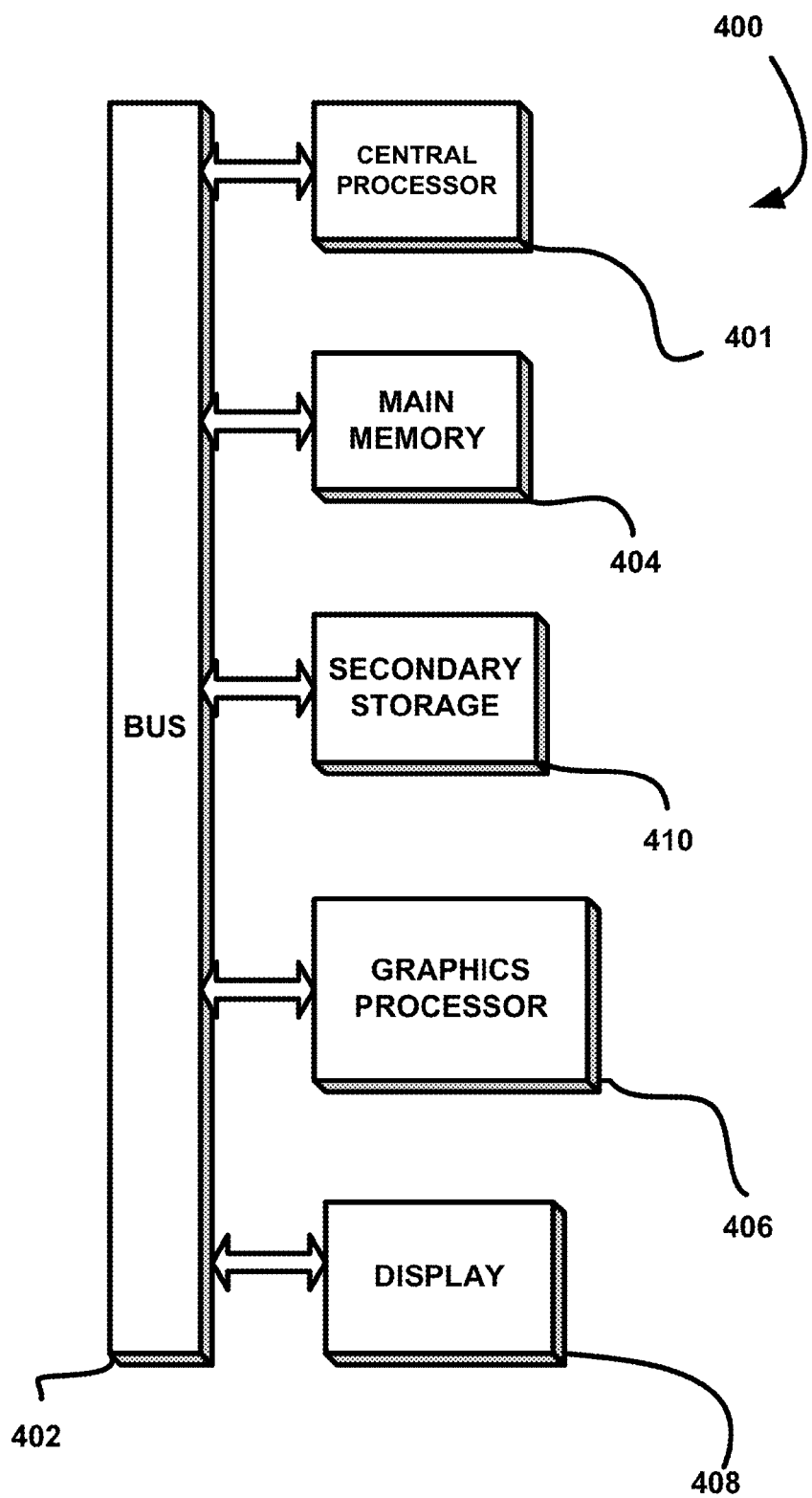
FIG. 4 illustrates an exemplary system, in accordance with one embodiment.

FIG. 4 illustrates an exemplary system 400, in accordance with one embodiment. As an option, the system 400 may be implemented in the context of any of the devices of the network architecture 300 of FIG. 3. Of course, the system 400 may be implemented in any desired environment.

As shown, a system 400 is provided including at least one central processor 401 which is connected to a communication bus 402. The system 400 also includes main memory 404 [e.g. random access memory (RAM), etc.]. The system 400 also includes a graphics processor 406 and a display 408.

The system 400 may also include a secondary storage 410. The secondary storage 410 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 404, the secondary storage 410, and/or any other memory, for that matter. Such computer programs, when executed, enable the system 400 to perform various functions (as set forth above, for example). Memory 404, storage 410 and/or any other storage are possible examples of tangible computer-readable media.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
presenting to a user an editor for defining a big data solution;
receiving from the user via the editor a plurality of component definitions created utilizing a domain specific language (DSL), the component definitions defining a plurality of components of the big data solution across disperse technologies, wherein the components include entities, events, and operations of the big data solution, and wherein the DSL provides integration of the components across the disperse technologies;
based on the component definitions and using a code generation tool that ties the disperse technologies, generating a plurality of artifacts, the artifacts including:
files, scripts, and configurations for systems,
a table with a defined schema and a partition strategy,
a structure definition that performs one or more validations,
a clean-up configuration that removes items older than a predetermined number of days, and
a schedule for implementing the clean-up configuration;
packaging the plurality of artifacts into a manifest, the manifest including a plurality of environment dependent variables;
when deploying the manifest to a target big data environment for operation as the big data solution, replacing each of the plurality of environment dependent variables of the manifest with target values dependent on the target big data environment to which the manifest is deployed.

2. The method of claim 1, wherein the plurality of component definitions include data structures associated with the big data solution.

3. The method of claim 1, wherein the components that include operations are, at least in part, lookup operations associated with the big data solution.

4. The method of claim 1, wherein replacing each of the plurality of the environment dependent variables of the manifest with the target values dependent on the target big data environment functions to provide an environment dependent value that is populated independent of a business process.

5. The method of claim 1, wherein the manifest further includes environment dependent configurations, and further comprising replacing the environment dependent configurations of the manifest with target configurations dependent on the target big data environment to which the manifest is to be deployed.

6. The method of claim 1, wherein generating the plurality of artifacts includes: defining schemas in a meta-store and scheduling jobs.

7. The method of claim 1, wherein the manifest further includes:
a list of the plurality of artifacts, and
a list of applications associated with at least one business process.

8. A computer program product embodied on a non-transitory computer readable medium, comprising computer code for:
presenting to a user an editor for defining a plurality of components of a big data solution;
receiving from the user via the editor a plurality of component definitions created utilizing a domain specific language (DSL), the component definitions defining a plurality of components of the big data solution across disperse technologies, wherein the components include entities, events, and operations of the big data solution, and wherein the DSL provides integration of the components across the disperse technologies;
based on the component definitions and using a code generation tool that ties the disperse technologies, generating a plurality of artifacts, the artifacts including:
files, scripts, and configurations for systems,
a table with a defined schema and a partition strategy,
a structure definition that performs one or more validations,
a clean-up configuration that removes items older than a predetermined number of days, and
a schedule for implementing the clean-up configuration;
packaging the plurality of artifacts into a manifest, the manifest including a plurality of environment dependent variables;
when deploying the manifest to a target big data environment for operation as the big data solution, replacing each of the plurality of environment dependent variables of the manifest with target values dependent on the target big data environment to which the manifest is deployed.

9. The computer program product of claim 8, wherein the computer program product is operable such that the plurality of component definitions include data structures associated with the big data solution.

10. The computer program product of claim 8, wherein the computer program product is operable such that the components that include operations are, at least in part, lookup operations associated with the big data solution.

11. A system comprising:
a memory system; and
one or more processing cores coupled to the memory system and that are each configured for:
presenting to a user an editor for defining a plurality of components of a big data solution;
receiving from the user via the editor a plurality of component definitions created utilizing a domain specific language (DSL), the component definitions defining a plurality of components of the big data solution across disperse technologies, wherein the components include entities, events, and operations of the big data solution, and wherein the DSL provides integration of the components across the disperse technologies;

based on the component definitions and using a code generation tool that ties the disperse technologies, generating a plurality of artifacts, the artifacts including:

files, scripts, and configurations for systems, a table with a defined schema and a partition strategy, a structure definition that performs one or more validations, a clean-up configuration that removes items older than a predetermined number of days, and a schedule for implementing the clean-up configuration;

packaging the plurality of artifacts into a manifest, the manifest including a plurality of environment dependent variables;

when deploying the manifest to a target big data environment for operation as the big data solution, replacing each of the plurality of environment dependent variables of the manifest with target values dependent on the target big data environment to which the manifest is deployed.

\* \* \* \* \*